United States Patent [19]

Eisenhandler et al.

[11] Patent Number: 5,452,291
[45] Date of Patent: Sep. 19, 1995

[54] COMBINATION BROUTER AND CLUSTER CONTROLLER

[75] Inventors: Sanford Eisenhandler, Belleville; Tayyab Chaudhry, Clark, both of N.J.; Xiaoyang Lee, New York, N.Y.; Ping S. Lam, Cranbury; Yosuke Fujita, Allendale, both of N.J.

[73] Assignee: Panasonic Technologies, Inc., Princeton, N.J.

[21] Appl. No.: 159,197

[22] Filed: Nov. 30, 1993

[51] Int. Cl.⁶ .......................................... H04L 12/28
[52] U.S. Cl. ...................................... 370/54; 370/60; 370/85.1; 370/85.13; 370/93
[58] Field of Search ............... 370/85.13, 85.9, 85.14, 370/56, 54, 94.3, 94.1, 60, 85.1, 62, 95.1, 95.3; 348/15

[56] References Cited

U.S. PATENT DOCUMENTS

| | | | |
|---|---|---|---|
| 4,317,196 | 2/1982 | Ulug | 370/60 |
| 4,876,681 | 10/1989 | Hagiwara et al. | 370/60 |
| 4,882,747 | 11/1989 | Williams | 348/15 |
| 4,939,724 | 7/1990 | Ebersole | 370/85.15 |
| 4,970,722 | 11/1990 | Preschutti | 370/94.3 |
| 5,068,916 | 11/1991 | Harrison et al. | 370/100.1 |
| 5,088,090 | 2/1992 | Yacoby | 370/85.13 |
| 5,195,091 | 3/1993 | Farwell et al. | 370/94.1 |
| 5,210,753 | 5/1993 | Natarajan | 370/95.1 |
| 5,212,806 | 5/1993 | Natarajan | 455/33.4 |
| 5,214,646 | 5/1993 | Yacoby | 370/85.13 |
| 5,295,154 | 3/1994 | Meier et al. | 370/95.1 |

OTHER PUBLICATIONS

Yang et al., "Investigation of the Performance of a Controlled Router for the CEBus", *IEEE Transactions on Consumer Electronics*, vol. 38, No. 4, pp. 831–841 (Nov. 1992).
Yang et al., "Router Connected Physical Media in Networking the Intelligent Home", *IEEE Transactions on Consumer Electronics*, vol. 38, No. 1, pp. 30–36 (Feb. 1992).
J. Hofmann, "The Consumer Electronic Bus Infrared System", *IEEE Transactions on Consumer Electronics*, vol. 37, No. 2, pp. 122–128 (May 1991).
Hargaden et al., "Functions and Operations of CEBus Routers", *IEEE Transactions on Consumer Electronics*, vol. 37, No. 2, pp. 135–144 (May 1991).

*Primary Examiner*—Douglas W. Olms
*Assistant Examiner*—Huy D. Vu
*Attorney, Agent, or Firm*—Ratner & Prestia

[57] ABSTRACT

An apparatus for transmitting data from a first device to a second device is provided. The invention is suitable for use in a system having first and second communications media. The apparatus includes a network interface coupled to the first medium for receiving and examining data from the first device. A clustering facility is provided for coupling the first device directly to the network interface and for selectively coupling the second device to the network interface. The network interface identifies the second device as being coupled to either the clustering facility or the second medium. The apparatus transmits the data from the network interface to the second device by way of the clustering facility, if the network interface identifies the second device as being coupled to the clustering facility. The apparatus routes the data from the network interface to the second device by way of the second medium if the network interface identifies the second device as being coupled to the second medium. In the exemplary embodiment, both media follow the Consumer Electronics Bus (CEBus) standard. For example, the first medium may be a wired coaxial cable medium, and the first device may be a video cassette recorder. The second medium may be a wireless infrared medium, and the second device may be a remote control unit.

20 Claims, 15 Drawing Sheets

COMBINATION BROUTER AND CLUSTER CONTROLLER

FIELD OF THE INVENTION

The present invention relates to the field of communications equipment, and in particular to networking devices suitable for transferring packets between two different media.

BACKGROUND OF THE INVENTION

A brouter is a networking device that includes the functions of a bridge (transfer of individual network protocol data units between two parts of a network) plus some functions of a router (e.g., forwarding or blocking packets between two media).

A brouter is often used in a local area network (LAN) to transfer a packet between two different media, particularly where one of the media types is wireless (i.e., Infrared or radio frequency). For example, a brouter may be used to transfer a packet from a wireless medium, such as an infrared (IR) remote control, to a wired medium, such as coaxial cable, or vice-versa. Brouters are used for connecting wired and wireless media because of considerations that are unique to wireless media (e.g., a single source transmission may result in multiple receptions at multiple entry points into the network). The brouter includes suitable physical layer and link layer communications functions that are unique to each respective medium over which the data are transferred.

In a typical conventional LAN configuration, as shown in FIG. 16, a brouter 600 and a group of devices 604–609 are each connected to a wired LAN medium 620. Each of the devices 604–609 has a respective transceiver 602a–602f for interfacing to the LAN medium 620. The brouter 600 connects to the LAN medium 620 and to a second medium 630, such as IR or RF. A wireless device 640 transmits packets to brouter 600. Incoming packets from the IR or RF medium 630 are received by the brouter and are transferred to a destination device 604–609 by way of the wired LAN medium 620. This configuration uses a plurality of network interfaces (e.g., transceivers) 602a–602f. This configuration also results in network traffic loading each time a packet is transferred between the wireless medium 630 and the wired medium 620.

As an example, a relatively new use for brouters is in the "smart home". In recent years, an increasing number of automated appliances and devices have been developed for home use. These include, but are not limited to, entertainment systems, washers, dryers, security and temperature control systems for air and hot water. The potential exists to provide communications among these appliances and devices.

The CEBus standard is a home automation standard intended to provide economical Local Area Network (LAN) communications among all of the automated devices within the home. CEBus supports remote control, status monitoring and clock synchronization. CEBus is defined in Electronics Industries Association EIA/IS-60, "Home Automation Standard (CEBus)", December, 1989. The CEBus protocol is also described in "Delay Performances of Standard and Modified CEBus Schemes", by A. Hussain et al. in IEEE transactions on Consumer Electronics, Vol. 38 Number 2, May, 1992, at pp. 77–79, and "Investigation of the Performance of a Controlled Router for the CEBus", by J. Yang et al., IEEE transactions on Consumer Electronics, Vol. 38 Number 4, November 1992, at pp. 831–832. The teachings of these two articles are hereby incorporated by reference for their teachings on CEBus. The CEBus Protocol is designed to provide communications between any devices on any of the physical media that support CEBus. These include power line, twisted pair, coaxial cable, Infrared (IR), radio frequency (RF) and Fiber Optic.

The CEBus standard employs a carrier sense multiple access protocol with contention detection and contention resolution (CSMA/CDCR). CEBus is based on the International Standards Organization's Open System Interconnect (ISO/OSI) seven layer model for communications. CEBus uses only four of the seven layers: the physical, datalink, network and applications layers. The physical layer supports a superior (driven) state and an inferior (not driven) state. Symbols are represented by pulse width encoding, so that the length of time between a transition of the carrier signal (e.g., high to low or low to high) defines the symbol. A 100 microsecond duration between transitions (the Unit Symbol Time or UST) represents a one; two UST's represents a zero; three UST's represents an end of file (EOF); and four UST's represent an end of packet (EOP). Another distinguishing feature of CEBus is the structure of the data link frame header, which includes a preamble, a control field, a destination address, a destination house code, a source address, a source house code, an information field and a frame check sum.

CEBus networks are typically implemented in dynamically reconfigurable tree (hierarchical) structures, so that there is a unique path between each pair of devices. As a result of this hierarchical topology, the networking device that transmits a packet need only determine whether to forward a packet to the next medium. The networking device need not perform the full suite of networking services (e.g., choosing one of several available paths between source and destination) that are required in mesh type networks. Furthermore, duplicate copies of packets are not created (with the exception of some systems using wireless media), so that the networking device need not sort out and discard duplicate packets. Because of the simplified routing in CEBus networks, the networking device of choice is often a brouter.

A typical application of CEBus is the transmission of a control signal from a digital IR remote control device to an audio visual component that is connected to a wired LAN medium (e.g., coaxial cable). A brouter may be connected to the LAN to be used as a wireless receiver to forward packets in either direction between the wireless IR medium and the wired LAN medium. Typically any of the devices (the brouter and the audio visual devices) connected to the wired LAN can communicate with any other device connected to the LAN by way of the wired medium. Commands from the IR remote control are received by the brouter and routed over the wired medium to the device that is being controlled.

For the configuration described above, each audio visual component has a respective network interface (e.g., a transceiver) which allows it to communicate over the wired LAN. Thus, in the typical application, costs are incurred for several network interfaces. Each time a command is transmitted from the remote control to an audio visual device, the command is routed over the wired LAN medium. This increases the network traffic load and may result in increased packet delay.

Although CEBus is designed to advance home automation by an order of magnitude, CEBus has not been installed widely in homes. Part of the reason is the interface cost between the devices and the communications medium. To make the "smart home" a reality, less expensive equipment is needed to connect consumer devices to CEBus LANs. Communications among equipment using other media may also be impacted by this problem.

A cluster controller or concentrator is a device that provides an interface for a plurality of devices (e.g., terminals) that are coupled to a processor or network. Instead of providing a network interface for each device, a single network interface is provided for the cluster controller. This simplifies the hardware for connecting the devices to the network or processor, and increases the efficiency of the processor communications; the processor need only communicate with a single physical device, the cluster controller. An example of a cluster controller is an IBM 3174 Establishment Controller.

Although cluster controllers enhance efficiency, the services they provide are limited to communications between the devices (e.g., terminals) and the processor or network. A cluster controller does not provide communications among the attached devices. For example, if two terminals are attached to a cluster controller and a message is to be passed between the terminals, the message is sent from the sending terminal through the cluster controller to the processor, and back from the processor through the cluster controller to the receiving terminal.

SUMMARY OF THE INVENTION

The present invention is embodied in apparatus for receiving data from a first medium and for transferring the data to either a local device or a second medium.

The apparatus receives data from the first medium. A network interface examines the data and identifies the data as being directed to either the local device or the second medium. A clustering facility is coupled to the network interface for coupling the local device directly to the network interface.

If the network interface identifies the data as being directed to the local device, the apparatus transmits the data from the network interface to the local device by way of the clustering facility. If the network interface identifies the data as being directed to the second medium, the data are transmitted from the network interface to the second medium.

DETAILED DESCRIPTION

OVERVIEW

Figure 1:
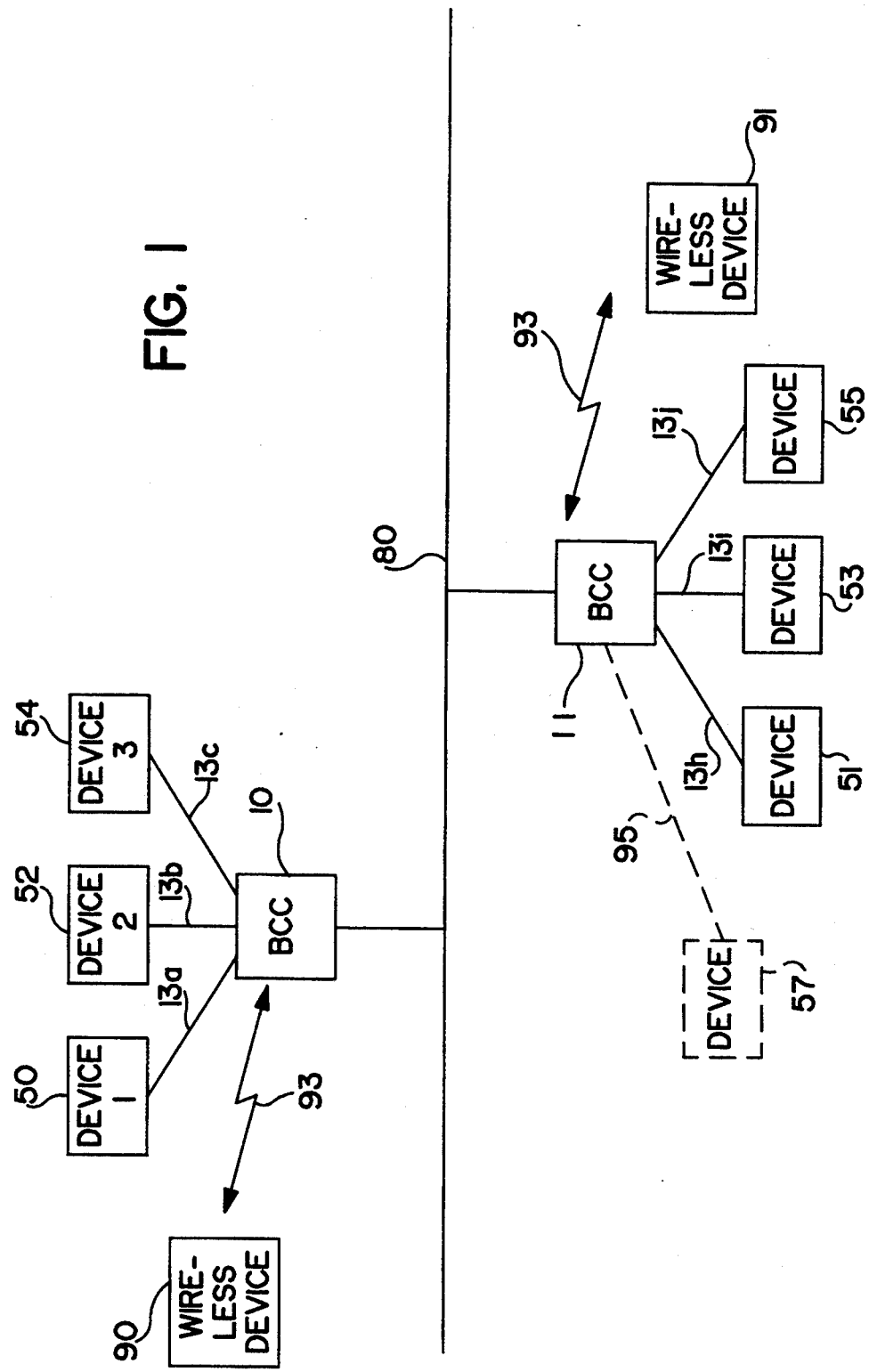
FIG. 1 is a block diagram of a system including an exemplary apparatus in accordance with the invention.

FIG. 1 is a block diagram of an exemplary system including exemplary brouter cluster controllers (BCC's) 10 and 11 in accordance with the invention. The brouter cluster controllers 10 and 11 combine the bridging (data link) and routing capabilities of a brouter (including the capability to transmit data from a first medium to a second medium) with the concentrating function of a cluster controller.

One or more BCC's may be coupled to a wired network 80; each BCC 10 and 11 supports a cluster of devices (devices 50, 52 and 54 coupled to BCC 10, and devices 51, 53 and 55 coupled to BCC 11). The BCC's may also communicate with devices by way of a second medium. For example, wireless devices 90 and 91 communicate with respective BCC's 10 and 11. Any device 50–55, 90 or 91 that communicates with any of the BCC's 10 and 11 can transmit a packet to any other device 50–55, 90 or 91 that is coupled to any of the BCC's 10 and 11.

BCC's 10 and 11 are preferably used in a network that includes more than one communications medium. For example, as shown in FIG. 1, devices 90 and 91 communicate with respective BCC's 10 and 11 by a wireless medium 93 (IR, RF or ultrasonic), and devices 50–55 communicate with the BCC's 10 and 11 by way of a clustering mechanism that includes dedicated private links 13a–13f (which may be a variety of configurations including wired and/or wireless links) coupled to each respective device. These private links may be wired or wireless links. Each BCC 10 and 11 is also coupled to a wired LAN medium 80 and a wireless medium 93. Each BCC 10 and 11 serves both as a cluster controller for the devices attached to the dedicated private links 13a–13f via the BCC, and as a brouter. The brouter function is effective for transferring packets between the wireless medium 93 and the wired medium 80, between the wireless medium 93 and the devices 50–55, and between the wired medium 80 and the devices.

A BCC 11 may also be used to transfer packets between two wired media. For example, as shown in phantom, a device 57 may be coupled to a second wired medium 95. BCC 11 can receive packets from a device 57 that is coupled by way of a twisted pair line.

In a typical configuration, BCC's 10 and 11 service two different areas. For example, BCC's 10 and 11 may be in different rooms, or on different floors of a building. Typical transmissions supported by the BCC's 10 and 11 are: from a wireless device 90 to a proximally located wired device 50; from a wireless device 90 to a remote device 51; from a wired device 50 to a proximally located wired device 52; from a wired device 50 to a remote wireless device 91; and from a wireless device 90 to a remote wireless device 91. Essentially, any-to-any connectivity is supported on the two media.

As an example, device 90 may be an IR remote control having an LCD display (not shown). Device 55 may be a compact disc (CD) player located remotely from BCC 10. A command may be sent from IR remote control 90, through BCC 10, LAN 80, and BCC 11 to CD player 55. In response to the command, CD player 55 may send back a status message through BCC 11, LAN 80 and BCC 10 to remote control 90. The status message may then be displayed on the LCD (not shown) of remote control 90. Alternatively, the status message may initiate a process in the remote control unit 90 that causes the LCD to display a menu or image of the CD control panel. Applications of this bidirectional communications capability include, but are not limited to displaying the CD control panel on the LCD of the remote control unit, or an "on screen display" of a command menu on the LCD of the remote control for programming the CD player 55.

In the configuration shown in FIG. 1, BCC 10 is effective to couple wireless device 90 to wired devices 50, 52 and 54 even if the network 80 is disabled or placed in an inactive state. Unlike apparatus in the prior art, packets between wireless device 90 and any of the wired devices 50, 52 and 54 are transferred directly from BCC 10 to the destination device without being routed over the network 80. This not only results in reduced packet delay, but reduces the volume of traffic on network 80, and eliminates the need for separate transceivers for each respective device.

Furthermore, BCC 10 can operate without the network 80, so that BCC 10 and devices 50, 52, 54 and 90 may be installed and connected to one another before network 80 is installed. This modular approach allows flexibility in installing and growing the network 80.

Figure 2:
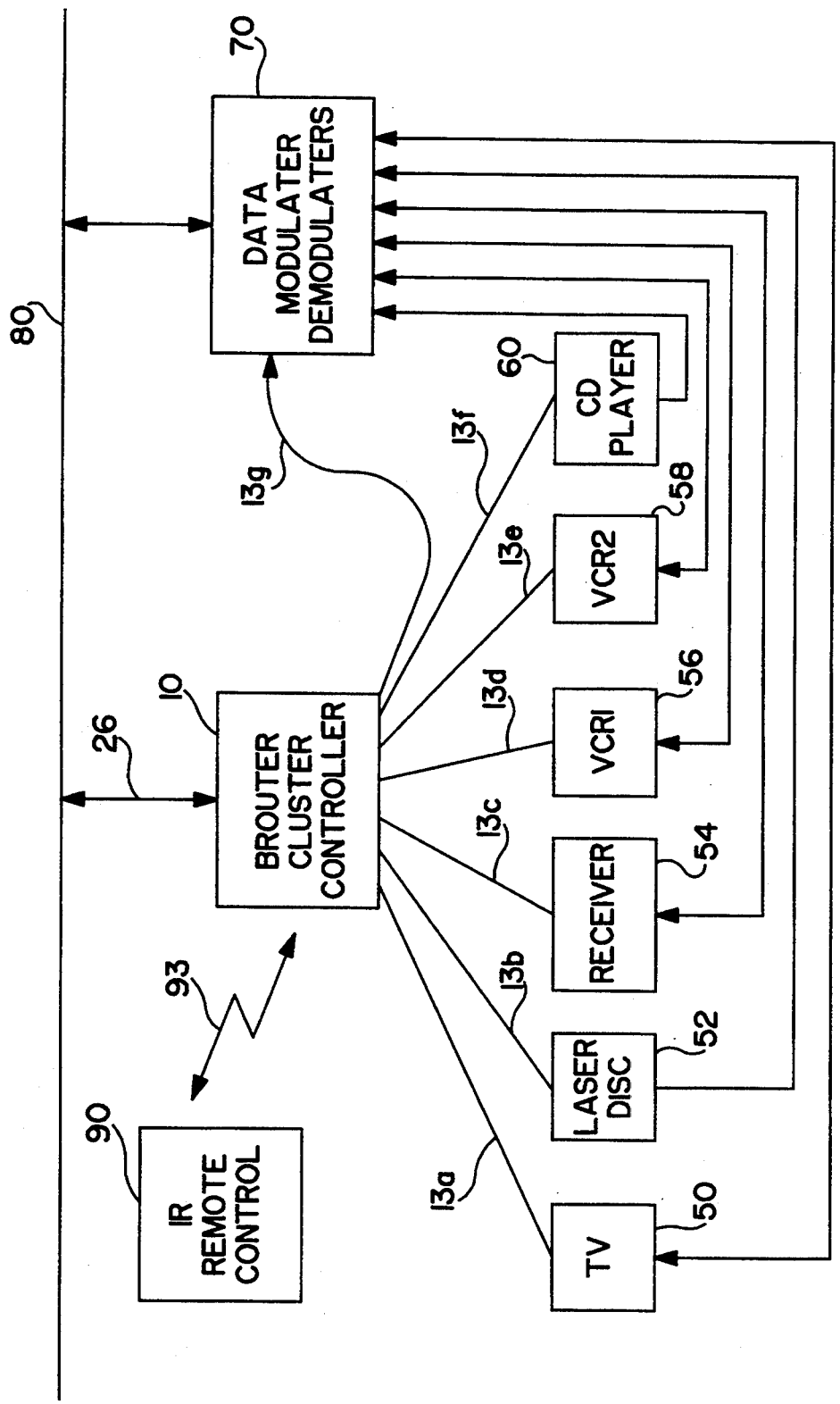
FIG. 2 is a block diagram of an automated home system including the brouter cluster controller shown in FIG. 1.
Figure 3:
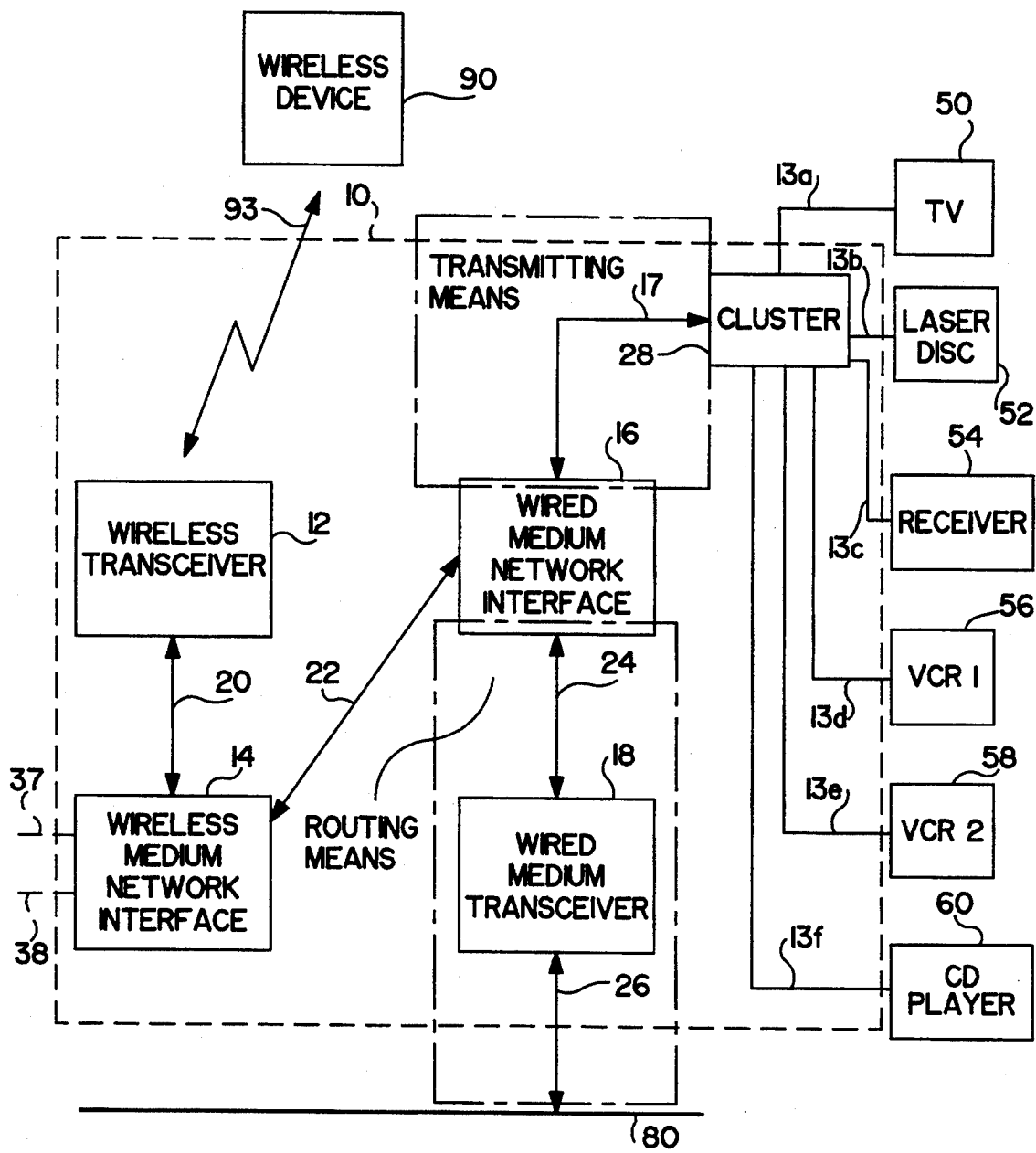
FIG. 3 is a block diagram of the brouter cluster controller shown in FIG. 2.

FIGS. 2 and 3 show an application of the invention in a home automation system including a plurality of consumer electronic devices (e.g., television 50, laser disc player 52, receiver 54, video cassette recorder (VCR) #1 56, VCR #2 58, compact disc (CD) player 60 and IR remote control unit 90). Referring first to FIG. 2, devices 50–60 are coupled via respective communications links 13a–13f to a brouter cluster controller (BCC) 10. BCC 10 is in turn connected to a local area network (LAN) 80. BCC 10 provides a single bidirectional command and status communications link 26 between LAN 80 and the devices 50–60. A wireless device, such as IR remote control unit 90 also communicates with BCC 10. In the exemplary embodiment, the CEBus communications protocol (CSMA/CDCR) is used on both the wired and wireless media.

In the following example, a command packet is sent from a first device, remote control unit 90, to a second device, VCR #1 56. It is understood by one skilled in the art that the terms "first device" and "second device" may each refer to any of the devices 50–60 and 90. IR remote control unit 90 may also receive, and the VCR 56 may also transmit, data by way of BCC 10. The choice of the wireless unit to transmit a packet and the wired unit to receive the packet is only an example, and is not meant to be limiting in any way.

BCC 10 transmits data from a first one of the plurality of devices (e.g., IR remote control unit 90) to a second one of the plurality of devices (e.g., television 50 or VCR #1 56), by way of a first (IR) medium and a second (wired) communications medium. In the exemplary embodiment, devices 50–60 are coupled to BCC 10 via the clustering means 28 and the IR remote control 90 communicates over the IR medium 93.

As shown in FIG. 3, BCC 10 includes wireless transceiver 12, a wireless network interface 14, a wired network interface 16 and a wired network transceiver 18. Network interface 14 is coupled to the wireless medium (LAN 93) by way of transceiver 12 for receiving and examining data from the first device (e.g., remote control unit 90). Clustering means 28 (described below with reference to FIG. 5) are provided for coupling the television 50 and VCR 56 directly to the network interface 16. The network interface 16 identifies the second device (television 50 or VCR 56) as being coupled to the clustering means 28, and forwards the packet. If the second device were a remote device coupled to LAN 80 or another BCC 11 (shown in FIG. 1), then the network interface 16 would recognize the destination as being located on the network 80 and the packet would be forwarded to the network 80 via transceiver 18.

In the next example, a status packet is sent from a first device, VCR 56, to a second device, remote control unit 90. The status packet may be a response to the command packet sent by the IR remote control 90 in the first example directly above.

BCC 10 transmits data from a first one of the plurality of devices (e.g., VCR #1 56) to a second one of the plurality of devices (e.g., television 50 or IR remote control unit 90), by way of a first (wired) medium and a second (IR) communications medium. In the exemplary embodiment, devices 50–60 are coupled to BCC 10 via the clustering means 28 and the IR remote control 90 communicates over the second (IR) medium 93.

As shown in FIG. 3, network interface 16 is coupled to the first device (VCR #1 56) by way of cluster 28 and link 17 for receiving and examining data from the first device (e.g., VCR #1 56). Clustering means 28 (described below with reference to FIG. 5) are provided for coupling the VCR #1 56 directly to the network interface 16 and for selectively coupling a second device (e.g., television 50 or remote control unit 90) to the network interface 16. The network interface 16 identifies the second device (television 50 or remote control unit 90) as being coupled to either one of the clustering means 28 or the second medium (wireless medium 93 or wired medium 26), respectively.

The BCC 10 transmits the data from the network interface 16 to the second device by way of the clustering means 28, if the network interface 14 identifies the second device as being coupled to the clustering means 28. For example, if the second device is television 50, then the network interface 16 recognizes that the second device is attached to the cluster, and the data are not transferred from the clustering means 28 to the wireless medium 93.

The apparatus routes the data from the network interface 16 to the second device by way of the IR medium 93 if the network interface 16 identifies the second device as being coupled to the second medium 93, as shown in FIG. 1. For example, if the second device is IR remote control unit 90, then the network interface 16 recognizes that the second device is on the IR medium 93, and the packet is transferred from the clustering means 28 or the wired medium 80 to the wireless medium 93.

BCC 10 may also exchange command and status data with a data modulator/demodulator 70 (shown in FIG. 2), by way of a communications link 13g. The data modulator/demodulator 70 decodes data that are transmitted by devices 50–60 in response to the commands that the devices receive.

DESCRIPTION OF THE EXEMPLARY EMBODIMENTS

Figure 4:
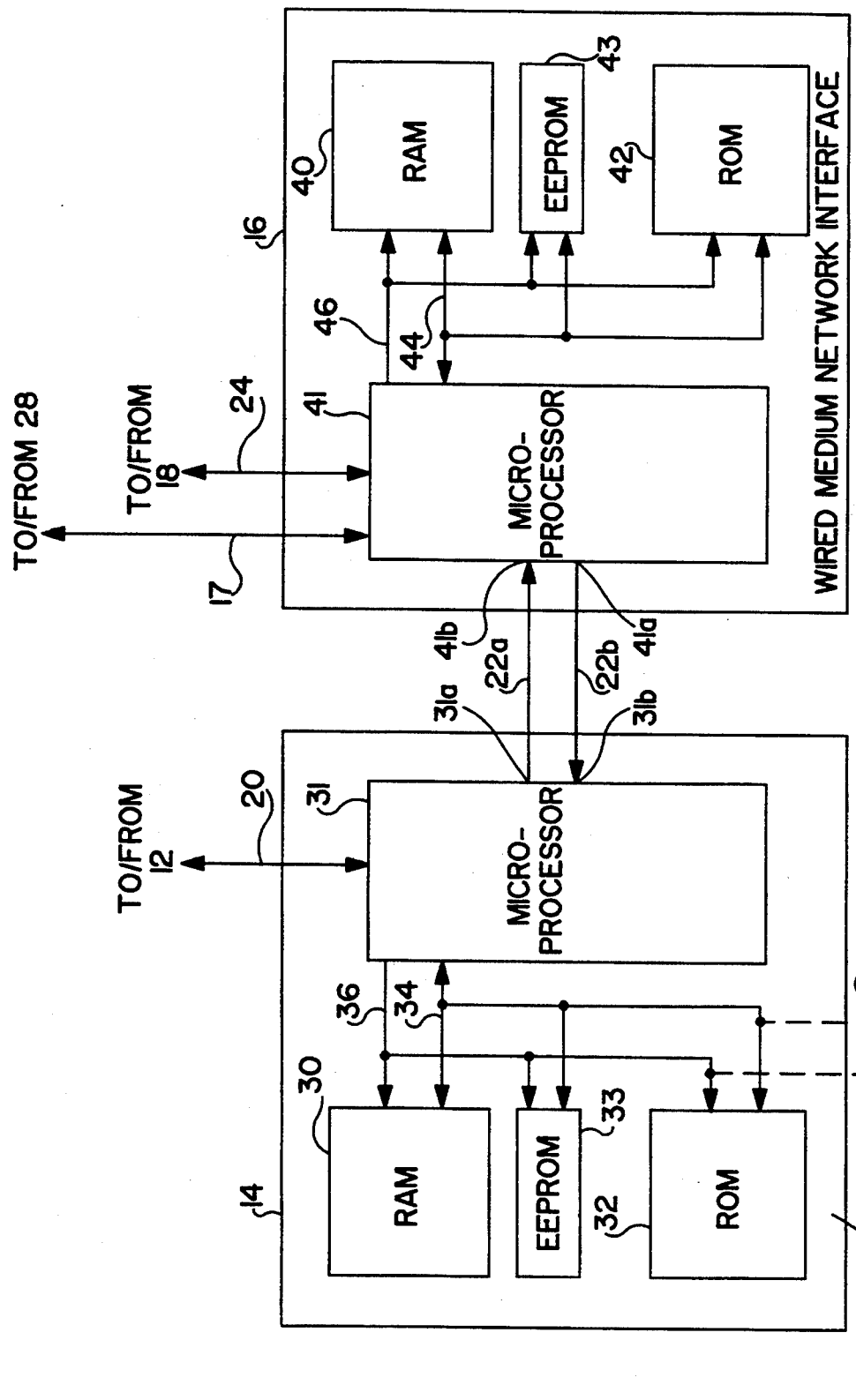
FIG. 4 is a block diagram of the wireless and wired network interfaces shown in FIG. 3.

As described above with reference to FIG. 3, the BCC 10 includes two network interfaces 14 and 16. Referring now to FIG. 4, the network interfaces 14 and 16 are shown in greater detail. In the exemplary embodiment, the CEBus protocol is followed, and interfaces 14 and 16 are CEBus Network Interfaces (CNI's). A CNI is an OSI design implementation of an interface between a device on the bus and the CEBus network. BCC 10 includes a wireless CNI 14 and a wired CNI 16 that are coupled together by a communications link 22 (FIG. 3), that includes lines 22a and 22b shown in FIG. 4.

In the exemplary embodiment, the CNI 14 includes a microprocessor 31, random access memory (RAM) 30 for data, and read-only memory (ROM) 32 for program storage. The exemplary microprocessor 31 is the Intel 8052 microcontroller. RAM 30 includes 2 kilobytes of memory and ROM 32 includes 32 kilobytes of memory. An additional non-volatile memory device, such as an electrically erasable programmable read only memory (EEPROM) 33 is provided. The ROM 32 stores the software that operates BCC 10. EEPROM 33 is used to store device commands and macros that may be uniquely defined for each installation, as explained in detail below.

An address bus 36 and data bus 34 couple the microprocessor 31 with its respective RAM 30, ROM 32 and EEPROM 33. Additionally, an optional Direct Memory Access (DMA) channel 37 or 38 may be provided to couple to the address bus 36 and data bus 34 respectively for downloading software to BCC 10, as described below. It is understood by one skilled in the art that the wired medium CNI 16 is arranged in the same configuration, in which microprocessor 41, RAM 40, ROM 42, EEPROM 43, data bus 44 and address bus 46 correspond to the microprocessor 31, RAM 30, ROM 32, EEPROM 33, data bus 34 and address bus 36, respectively, as shown in FIG. 4.

Symbols on wireless medium 93, wired medium 80, line 20 (which couples transceiver 12 to microprocessor 14) and line 24 (which couples transceiver 18 to microprocessor 16) are encoded as driven or undriven state durations in multiples of 1 UST (100 microseconds). The time between transitions determines the symbol. A transceiver 12 converts the signal it receives to digital form. The digital transitions delineate the symbols 1, 0, EOF and EOP. An external interrupt pin (not shown) on the microprocessor 31 provides the input signal to the microprocessor. This input signal gates an internal counter (discussed below with reference to FIGS. 5 and 6) so that each transition causes a receive counter interrupt and freezes a symbol duration count. The interrupt routine decodes the duration count to receive the symbol.

The clustering mechanism 28 between the devices 50–60 and BCC 10 may include wired or wireless links or a combination of the two. In the exemplary embodiment, all of the links 13a–13g are "wired" links from the output port of microcomputer 41 to a respective device or an LED that communicates with an IR input port on the device 50–60 via an IR signal.

When a packet is received by either the wired or wireless network interface and is destined for the other of the wired and wireless interfaces, the packet is transmitted between the network interfaces via the path 22. Communications path 22 is a serial asynchronous communications channel that connects the serial ports 31a, 31b, 41a and 41b of microprocessors 31 and 41. The exemplary protocol used on this channel is a digital RS-232 link without the handshaking lines. The link comprises two ports (transmit 31a and receive 31b) on microprocessor 31, and two lines 22a and 22b coupled to the respective ports. One line 22a connects the transmit port 31a of microprocessor 31 and the receive port 41b of microprocessor 41. The other line 22b connects the transmit port 41a to receive port 31b.

The serial ports 31a, 31b, 41a and 41b are driven by low priority serial port interrupts every 400 microseconds. The serial port interrupt uses a normal interrupt of microprocessor 31. The ports are set to operate at a 25 kilobit per second data rate. 400 microseconds are available per byte (Each eight bit byte has two framing bits—a start bit and a stop bit—for a total of 10 bits.) to take the data out of a holding register in RAM 30 and store the data. This allows sufficient time to store the data. Thus, the interface between microprocessors 31 and 41 is implemented with no additional hardware.

Whenever data are transferred between the wireless and wired media, the data are transmitted over the serial link 22. A serial receive interrupt occurs each time a full byte is received over the serial port. A serial port interrupt receive routine sets a flag that is checked by the network layer 100 (shown in FIG. 9) when a valid packet is received from the other medium. The transmit process is "jump started". "Jump starting" is a hardware interrupt caused by embedded software for operating the serial transfer from one network interface to the other. When the serial transmit buffer (of the sending network interface) is empty, all pointers are reset and the process is terminated.

In the exemplary embodiment, common application language (CAL) encoded sequences are downloaded to microcomputer 31 for all of the device commands and macros (procedures) used by devices 50–60. Respective translations of the CAL commands and macros into IR sequences are downloaded to BCC 10. The media access control (MAC) addresses of the devices 50–60 and the address of BCC 10 itself are also downloaded to BCC 10. The command sequences and macros, the translations, and the MAC addresses are all stored in a non-volatile memory device such as EEPROM 33. When BCC 10 receives a CAL command from the CEBus LAN 80 or from the IR medium 93, BCC 10 decodes the CAL command and translates the command to the previously loaded IR sequence in EEPROM 33 that is associated with that command. BCC 10 sends the decoded IR command to the device that has the MAC address previously downloaded to the BCC 10.

To download the software, another processor (not shown) may be coupled to microprocessors 31 and 41. In the exemplary embodiment, because the serial ports 31a, 31b, 41a and 41b are used for communications between processors 31 and 41, it is desirable to multiplex into the serial link 22 and disable BCC 10 while the sequences, translations and addresses are being downloaded.

An alternative method for downloading the commands to EEPROM 33, as described above with reference to FIG. 4, uses a DMA channel 37, as shown in phantom in FIG. 4. The address table and commands, macros (procedures) and translations may all be downloaded from this channel. If DMA is used, the software may be downloaded to one of the CNI's 14 as shown, and transferred to the other CNI 16 by way of the serial link 22. Alternatively, the DMA channel may be coupled to the wired medium CNI 16, or an additional DMA channel (not shown) may be provided for the wired medium CNI.

In order to provide the clustering function, there are several spare port bits (not shown) on microcomputer 41, each of which may be used in a dedicated fashion to drive a respective device in the respective cluster. Microcomputer 41 is set up to send one command to one device 50-60 at a time. If the number of devices desired in a cluster exceeds the number of spare port bits, a multiplexer (not shown) may be used in conjunction with one of the port bits to service additional devices. Alternatively, a "1 of 8" decoder 74 (shown in FIG. 5) may drive one of up to eight devices, based on the signals from four input bits (3 address bits and 1 data bit) from microcomputer 41.

Figure 5:
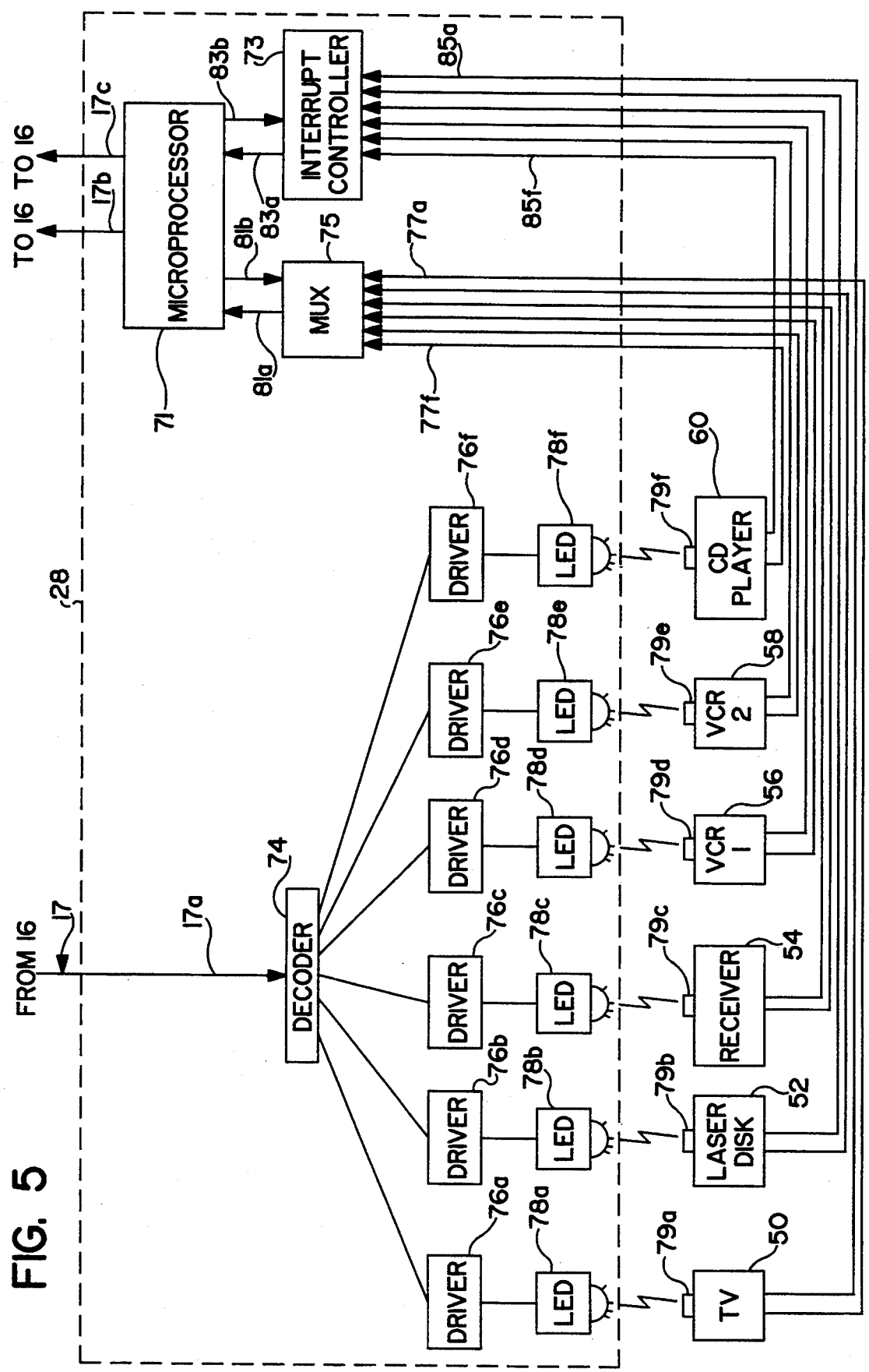
FIG. 5 is a block diagram of the clustering means shown in FIG. 3.

FIG. 5 is a block diagram of an exemplary embodiment of the clustering means 28 shown in FIG. 3. The embodiment of FIG. 5 is intended to provide maximum compatibility with existing devices 50-60 that use IR remote control devices. For this reason, communications from clustering means 28 to the devices 50-60 use infrared communications links.

Clustering means 28 include a decoder that is connected to an output port (not shown) of microprocessor 41 (shown in FIG. 4) by a cable 17 that includes a transmit line 17a, a receive line 17b and an interrupt line 17c. The decoder 74 receives a value from microprocessor 41 and selectively activates one of the drivers 76a-76f to activate a respective light emitting diode (LED) 78a-78f. Drivers 76a-76f may be transistors or other devices capable of driving the LEDs 78a-78f. Each of the LEDs 78a-78f is directed at the respective IR window 79a-79f of a respective device 50-60. This is a solution to a problem that could occur if two devices 50-60 were each to respond to the same IR command sequence. By preventing each device 50-60 from receiving IR signals from more than one LED, this problem is avoided.

Communications from the devices 50-60 back to clustering means 28 may be implemented using wireless or wired media. The exemplary embodiment shown in FIG. 5 shows a wired medium 77a-77f, 85a-85f implementation. It is understood that communications links 77a-77f and 85a-85f may be implemented as wireless links.

When a device (e.g., television 50) has a command or status message to send through BCC 10, the device 50 transmits a signal over respective line 85a to interrupt controller 73. Interrupt controller 73 in turn sends an interrupt signal to microprocessor 71 via line 83a. Microprocessor 71 sends an acknowledgement to controller 73 via line 83b. Microprocessor 71 sends a mux select signal to multiplexer 75 via line 81b, to set multiplexer 75 to enable the respective data line 77a for television 50. Television 50 transmits a command or status packet to microprocessor 71 via line 77a, multiplexer 75 and data line 81a. Microprocessor 71 transmits an interrupt signal to the interrupt line 17c of wired medium network interface 16, and transmits the packet to interface 16.

SOFTWARE ARCHITECTURE

Figure 9:
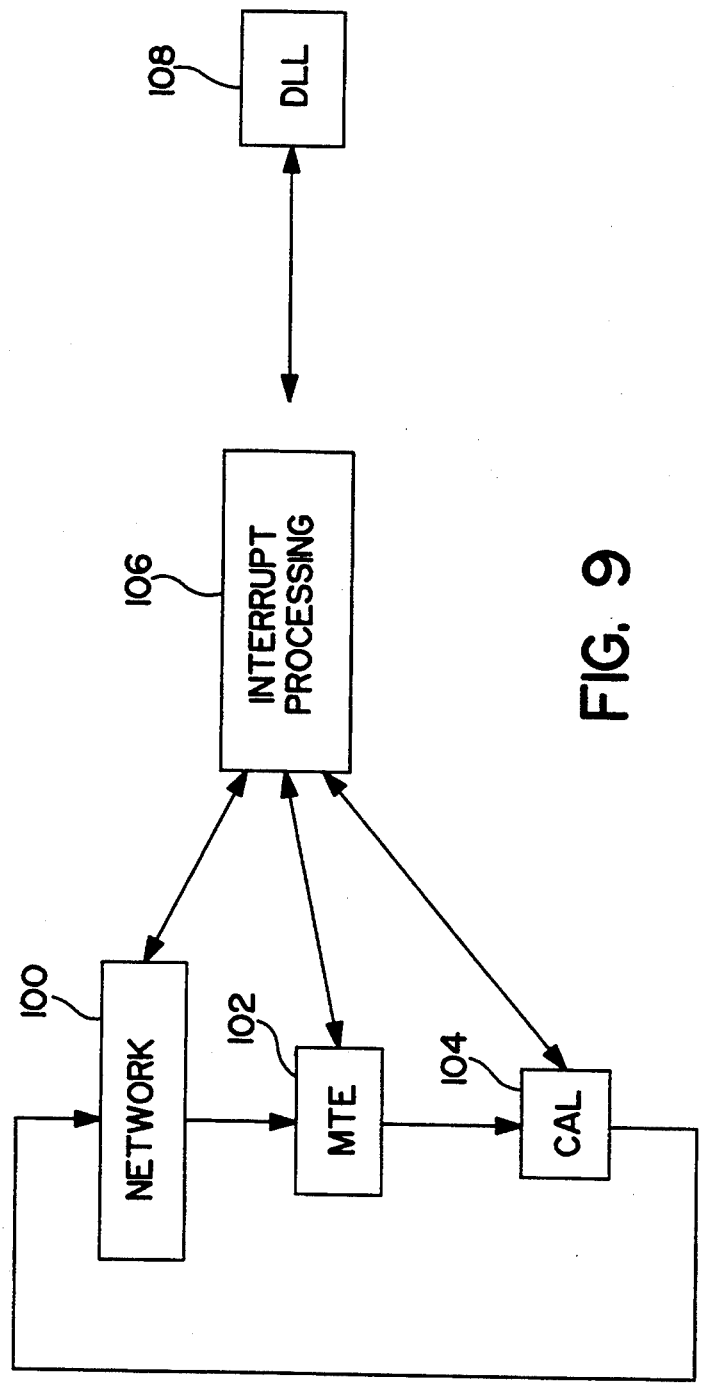
FIG. 9 is a flow chart diagram showing the main steps executed by the network interfaces shown in FIG. 4.

In the following discussion, reference is made to the processes performed in one of the CNI's 14 and 16. It will be understood by one skilled in the art that similar processes (e.g., application, network layer and data link layer) are executed in each of the CNI's in BCC 10. It is also understood that the protocol for BCC 10 complies with CEBus interface standards as set forth in "The CEBus Brouter Protocol Draft Standards: Vol. 6 Revised Version", Electronic Industries Association, Jan. 15, 1992, which describes the physical, link layer and network layer interface requirements for CEBus. Timing requirements that are not discussed herein are implemented according to CEBus standards. FIG. 9 is a block diagram of the main processes of the BCC 10 software. Each microprocessor 31, 41 is always executing one of the five processes shown in FIG. 9.

Referring to FIG. 9, the application layer of the CEBus protocol comprises the message transfer element (MTE) function 102 and the common application language (CAL) function 104. These application layer functions service the attached device. The loop comprising the network layer 100, MTE 102 and CAL 104 executes continuously.

Interrupt processing 106 is performed when one of several events occurs. These events include: receipt of an external transmission; detection of a collision while attempting to transmit data; time-out of an internal counter (a receive counter, a transmit counter or a bus quiet counter); a DLL preemptive processing counter interrupt to interleave DLL processing with main loop processing; or application interrupts, which may be serial link interrupt, counter interrupt or an external interrupt. Several of these interrupts are discussed in greater detail below, with reference to FIGS. 11-14.

The Data Link Layer (DLL) 108 decodes and stores the packet into a circular queue implemented in the RAM 30 or 40 as they are received, retaining access to the data via another circular queue, also implemented in the RAM, which holds packet addresses. DLL performs packet integrity checks as packets arrive so the CNI 14 knows immediately upon receiving an EOP symbol whether or not to accept the packet, send an IACK (immediate acknowledge packet), etc. An accepted packet is forwarded to network layer 100. DLL is run preemptively at a rate that varies depending on what state the DLL is in.

Network layer block 100 performs the functions of the OSI network layer. Among these functions is brouter addressing. A brouter address/DLL address table is provided and stored in EEPROM 33 (shown in FIG. 4) for use by the network layer. Every datum received is checked to determine whether it includes a brouter address. A brouter address is present if the data are transferred from and/or to a wireless device over the wireless medium 93.

Figure 6:
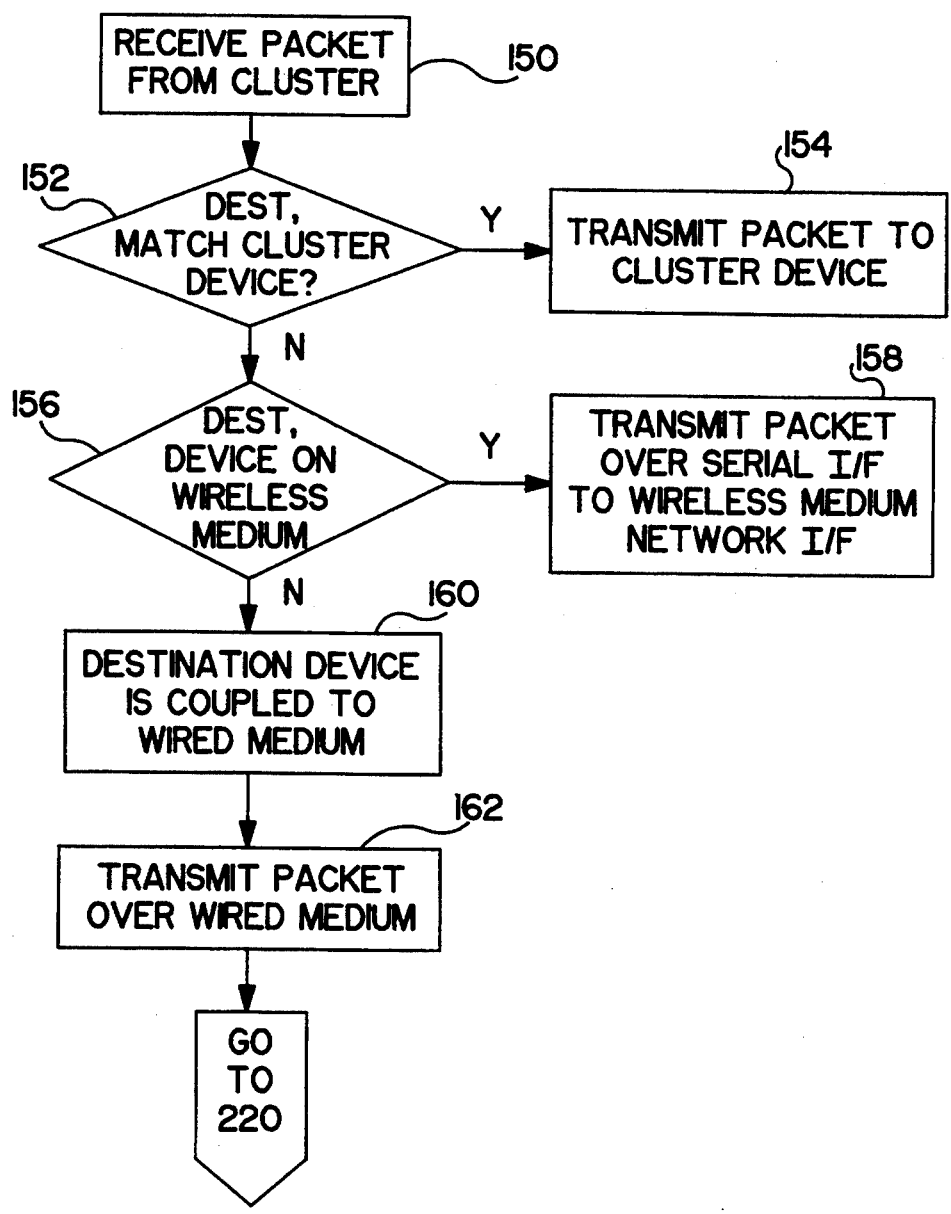
FIG. 6 is a flow chart diagram showing the steps executed when a packet is received by the BCC from a device attached to a cluster shown in FIG. 1.
Figure 7:
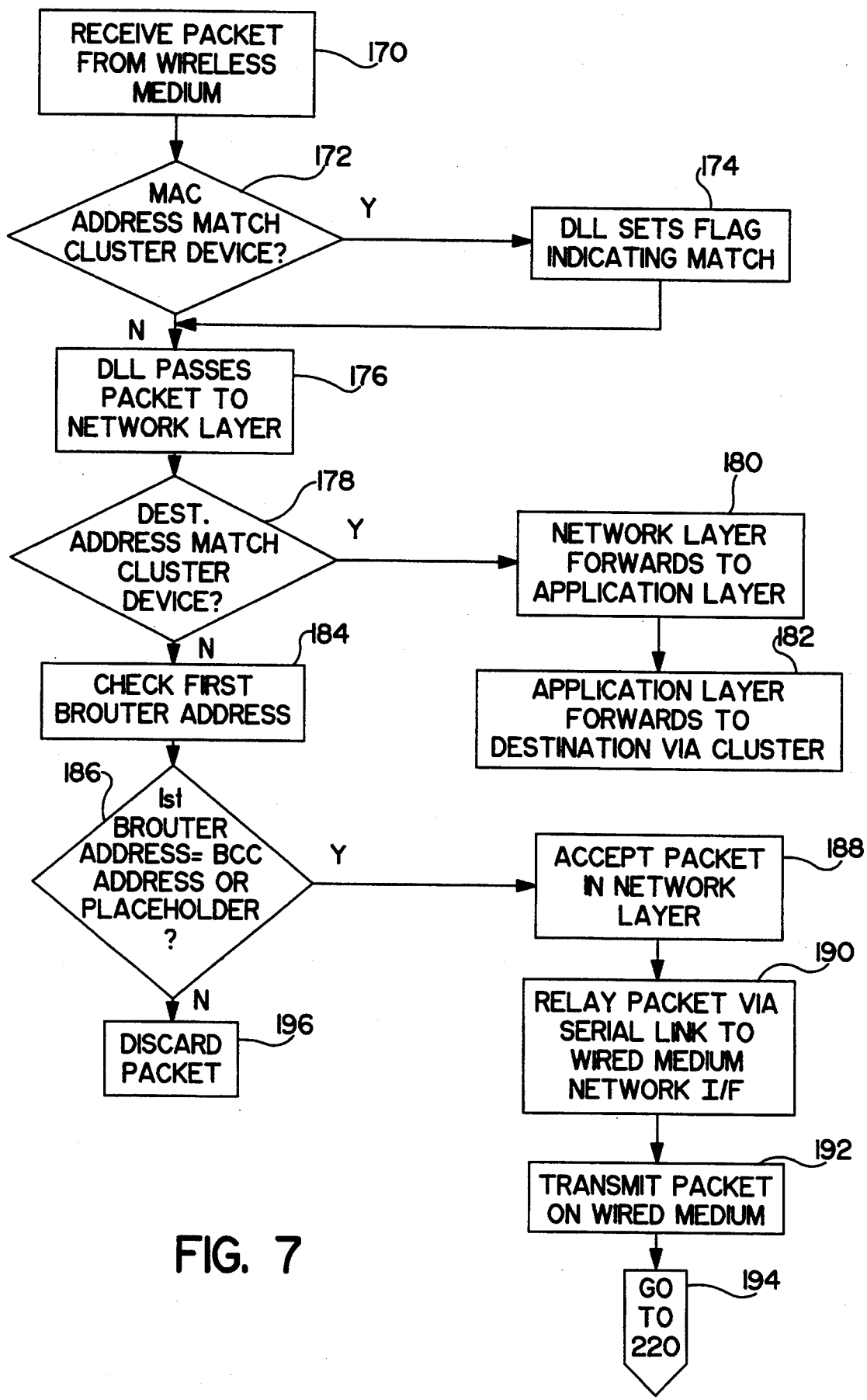
FIG. 7 is a flow chart diagram showing the steps executed when a packet is received by the BCC from the wireless medium shown in FIG. 1.
Figure 8:
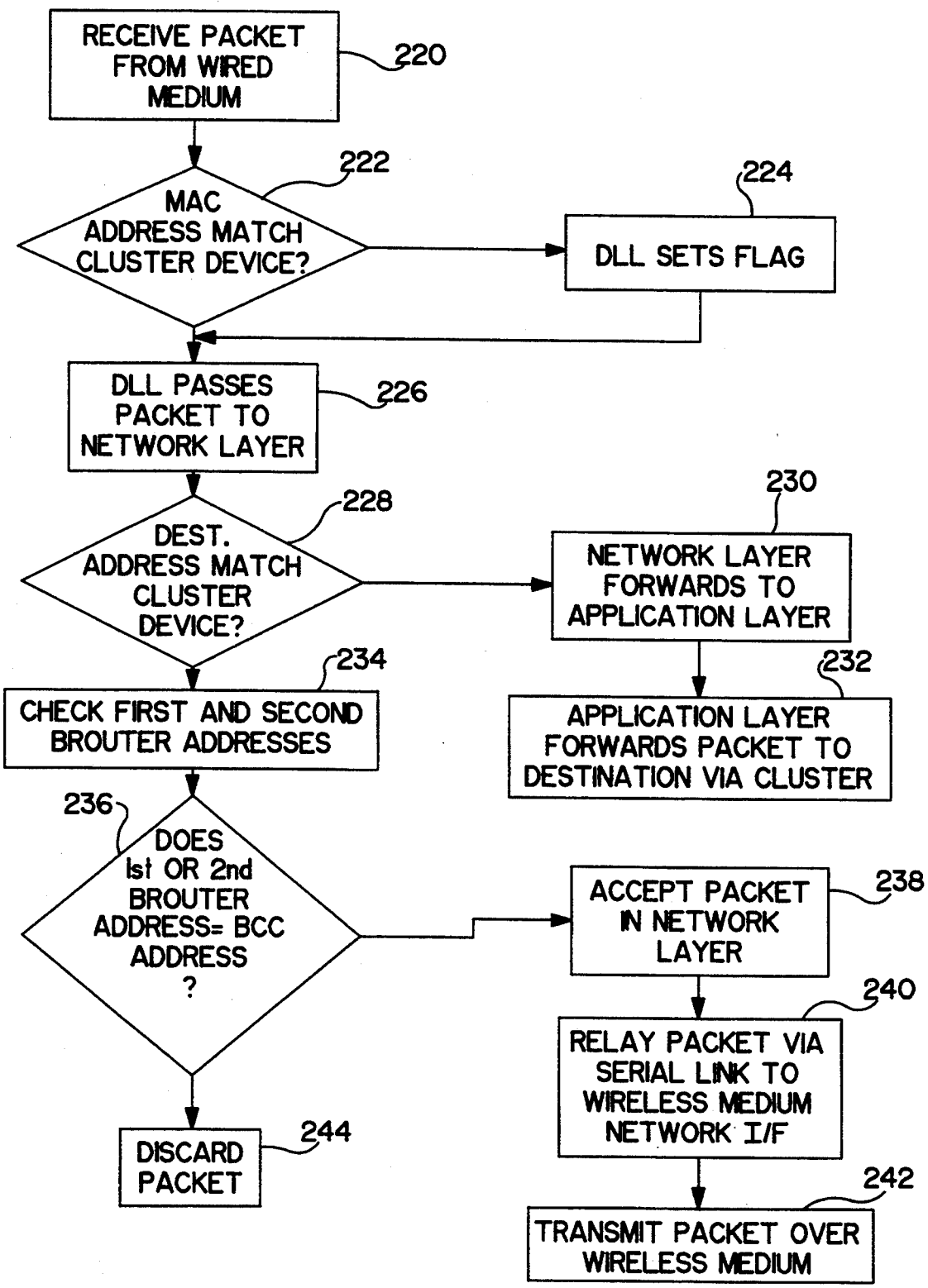
FIG. 8 is a flow chart diagram showing the steps executed when a packet is received by the BCC from the wired medium shown in FIG. 1.

FIGS. 6–8 show how routing decisions are made based on the brouter address(es) in the network header of a received packet. The network header processed by network layer 100 may contain up to two brouter address fields. A brouter address is present in a packet's network header when the packet originates at, or is sent over, a wireless medium. Two brouter addresses are present if the packet is sent from a first wireless device through a first BCC, over the wired medium, through a second BCC to a second wireless device (e.g., from device 90 to device 91 in FIG. 1). Note that when a packet is sent out to the wireless medium, the brouter address is the address of BCC 10, and the destination address is the address of the device on the wireless medium.

For example, if a packet is sent from CD player 60 to remote control 90 by way of BCC 10 (in the configuration shown in FIG. 3), the first brouter address in the network header will be the address of BCC 10. Once the packet is received by BCC 10, BCC 10 uses the address information stored in EEPROM 43 (shown in FIG. 4) to determine that the packet should be relayed to the wireless side 14 of BCC 10 and then to the remote control unit 90.

In a further example, a packet is sent from wireless device 90 to a wireless device 91. The packet has a first brouter address that is the MAC address of BCC 10, or possibly a placeholder (A placeholder is a standard value of 'FFFF' in the first brouter address field. When the first brouter address has the placeholder value, a packet received by the wireless medium network interface is accepted). The second brouter address is the MAC address of BCC 11.

FIG. 6 is a flow chart diagram of the steps executed when BCC receives a packet from clustering mechanism 28.

Referring now to FIG. 6, at step 150, a packet is received by BCC 10 from a device (e.g., 50, 52 or 54 shown in FIG. 1) by way of the clustering mechanism 28 (shown in FIG. 5). At step 152, network layer 100 determines whether the destination address matches the destination address of another one of the devices coupled to the same clustering mechanism 28. If so, at step 154 the packet is transmitted from network layer 100 to the destination device 50, 52 or 54 without sending the packet over the wired medium 80 or the wireless medium 93.

If at step 152 the destination address of the packet does not match the device address of any of the other devices 50, 52 or 54 attached to the same clustering mechanism 28, then at step 156 network layer 100 determines whether the destination address matches the address of one of the devices (e.g., remote control 90) on the wireless medium 93 that are identified in the address table of BCC 10. Those devices on the wireless side of BCC 10 are listed in the address table. If the destination address of the packet matches the address of one of the wireless devices identified in the address table at step 156, then at step 158 network layer 100 transmits the packet over the serial interface 22 from the wired medium network interface 16 to the wireless medium network interface 14. The packet is then received by the network layer process running in the wireless medium network interface 14.

At step 156, if the destination address of the packet does not match the destination address of any of the devices 50, 52 or 54 attached to the clustering mechanism 28 or any of the devices (e.g., remote control 90) coupled to BCC 10 by way of the wireless medium, then at step 160 network layer 100 assumes that the destination device is coupled to the wired medium (either directly, or by way of a second BCC 11). At step 162 BCC 10 then transmits the packet over the wired medium, as shown in FIG. 8 at step 220.

FIG. 7 is a flow chart diagram of the steps executed by the network layer when BCC 10 receives a packet via the wireless medium 93. At step 170, wireless network interface 14 receives a packet from the wireless medium 93. At step 172, the data link layer (DLL) in interface 14 checks the destination media access control (MAC) address to determine whether the destination device is one of the devices 50, 52 or 54 coupled to the clustering mechanism 28 of BCC 10. If the MAC address matches at step 172, then at step 174, the DLL sets a flag before sending the packet on to the network layer 100 at step 176. At step 178, network layer 100 checks the flag to determine whether the device is coupled to clustering mechanism 28. If, at step 178, the destination address matches the address of a device 50, 52 or 54 attached to clustering mechanism 28, then at step 180, network layer forwards the packet to the application layer. At step 182, the application layer forwards the packet to the destination device by way of the clustering mechanism 28.

If at step 178 wireless network interface 14 receives a packet from the wireless medium and the destination MAC address does not match any of the devices 50, 52, 54 coupled to clustering mechanism 28, then at step 184 network layer 100 checks the first brouter address in the packet. At step 186, if the first brouter address matches, or if the first brouter address is a placeholder, then at step 188 a packet from the wireless medium 93 is accepted. (If the wireless device does not know the brouter address of BCC 10, the device may set the brouter address field to a placeholder. Network layer 100 accepts the packet with the placeholder in the first brouter address field.) At step 190, the packet is relayed via the serial link 22 from the wireless medium network interface 14 to the wired medium network interface 16. Then at step 192, the packet is relayed to the wired medium 80. At step 194, the packet is received by a device or another BCC 11 coupled to wired medium 80, as shown in FIG. 8 at step 220.

If at step 186, the first brouter address does not match the address of BCC 10, and the first brouter address is not a placeholder (i.e., the packet is not intended to be routed via BCC 10), then BCC 10 does not accept the packet, and the packet is discarded at step 196.

FIG. 8 is a flow chart diagram of the steps executed by the network layer when a packet is received by BCC 10 via the wired medium 80. At step 220, wired medium network interface 16 receives a packet from the wired medium 80. At step 222, the data link layer (DLL) in interface 16 checks the destination media access control (MAC) address to determine whether the destination device is one of the devices 50, 52 or 54 coupled to the clustering mechanism 28 of BCC 10. If the MAC address matches, at step 222, then at step 224 the DLL sets a flag. At step 226 the DLL sends the packet on to the network layer 100. At step 228, the network layer 100 checks the flag to determine whether the device is coupled to clustering mechanism 28. If, at step 228, the destination address matches the address of a device 50, 52 or 54 attached to clustering mechanism 28, then at step 230 the network layer forwards the packet to the application layer. At step 232 the application layer forwards the packet to the destination device by way of the clustering mechanism 28.

At step 228, if the destination address does not match any device coupled to clustering mechanism 28, then at step 234 network layer 100 checks both the first and second brouter addresses. The first brouter address matches if the destination is a device (e.g., device 90) on the wireless medium 93 coupled to BCC 10, and the source of the packet (e.g., device 51) is not a device on the wireless medium. The second brouter address matches if the destination is a device (e.g., device 90) on the wireless medium 93 coupled to BCC 10, and the source of the packet is a device (e.g., device 91) on the wireless medium coupled to BCC 11. At step 236, if either the first or second brouter address matches the BCC 10 address, then at step 238 the packet is accepted by the network layer. At step 240, network layer 100 relays the packet to the wireless network interface 14 via serial link 22. At step 242, wireless network interface 14 relays the packet over the wireless medium 93.

If the destination device is not coupled to clustering mechanism 28 at step 228, and neither the first or second brouter addresses match the brouter address of BCC 10 at step 236 (The packet is not intended to be routed through BCC 10), then the packet is discarded at step 244.

If a brouter address is present in a received packet, then the source address (including the source house code) within the DLL header of the packet and the brouter address are added to the table. For transmitted packets, the destination address of an outgoing transmission is used to search the table. If a match is found, then the associated brouter address is also included in the network header.

Figure 10:
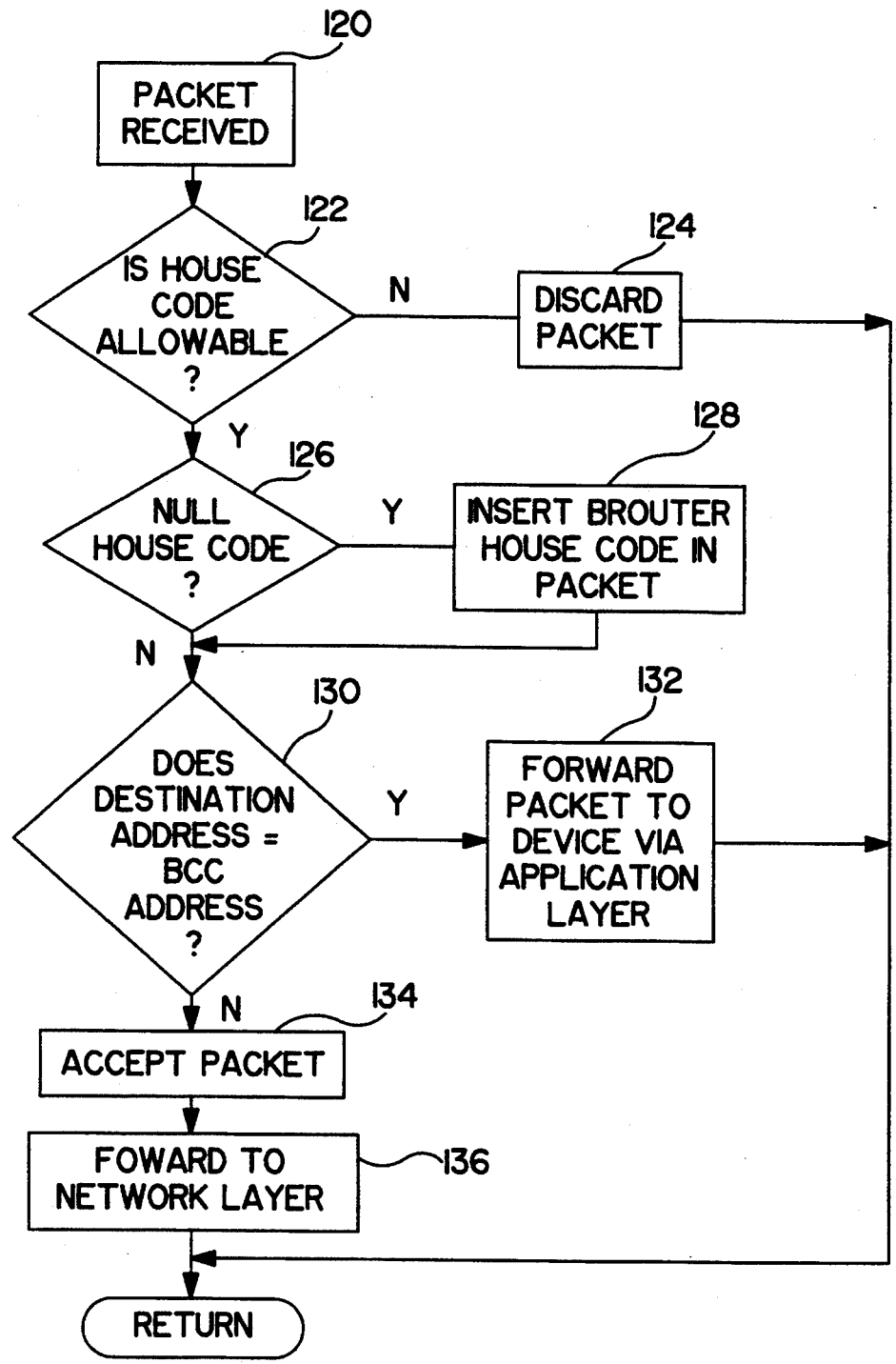
FIG. 10 is a flow chart diagram showing the steps executed by the data link layer shown in FIG. 9, while receiving a packet.

FIG. 10 is a flow diagram of the DLL process 108. At steps 120 and 122, the DLL 108 accepts packets with any DLL address so long as the destination house code is in the table of allowable house codes, referred to above. If it is not, the packet is discarded at step 124. At step 126, if a packet is received from the wireless medium having a null destination house code, then the house code of the recipient brouter is inserted into the packet at step 128. At step 130, the destination address in the DLL address header is compared with the BCC address. If they match, then at step 132, the packet is forwarded to the application layer, which interfaces with the cluster devices. If, at step 130, the destination address in the DLL header does not match any of the cluster device addresses, then the packet is accepted at step 134 and relayed to the network layer for further examination. At step 136 it is processed for further action by the network layer 100, to check brouter addressing.

Figure 11:
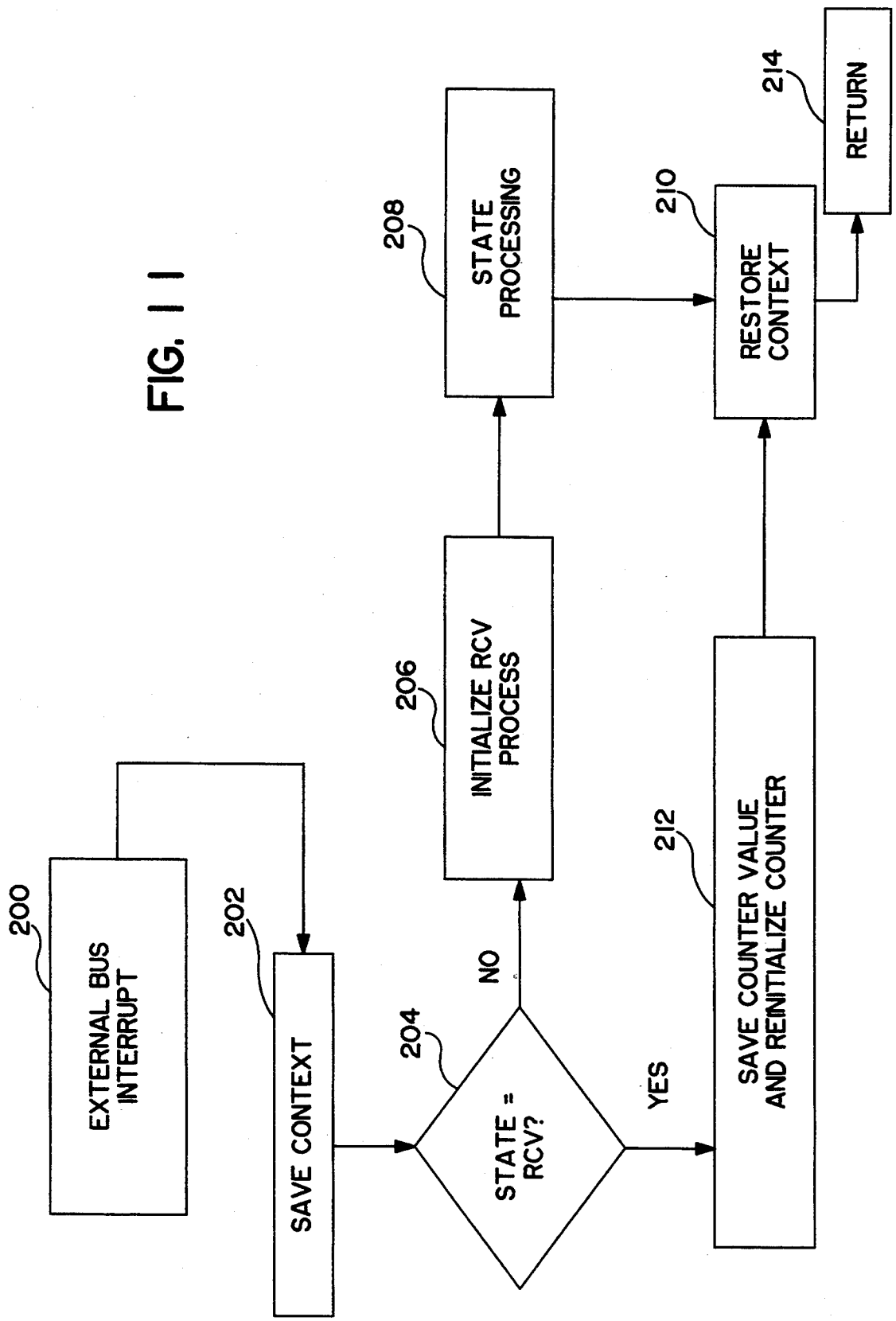
FIG. 11 is a flow chart diagram showing initialization and resetting of the receive decoding counter in the network interface shown in FIG. 4.
Figure 12:
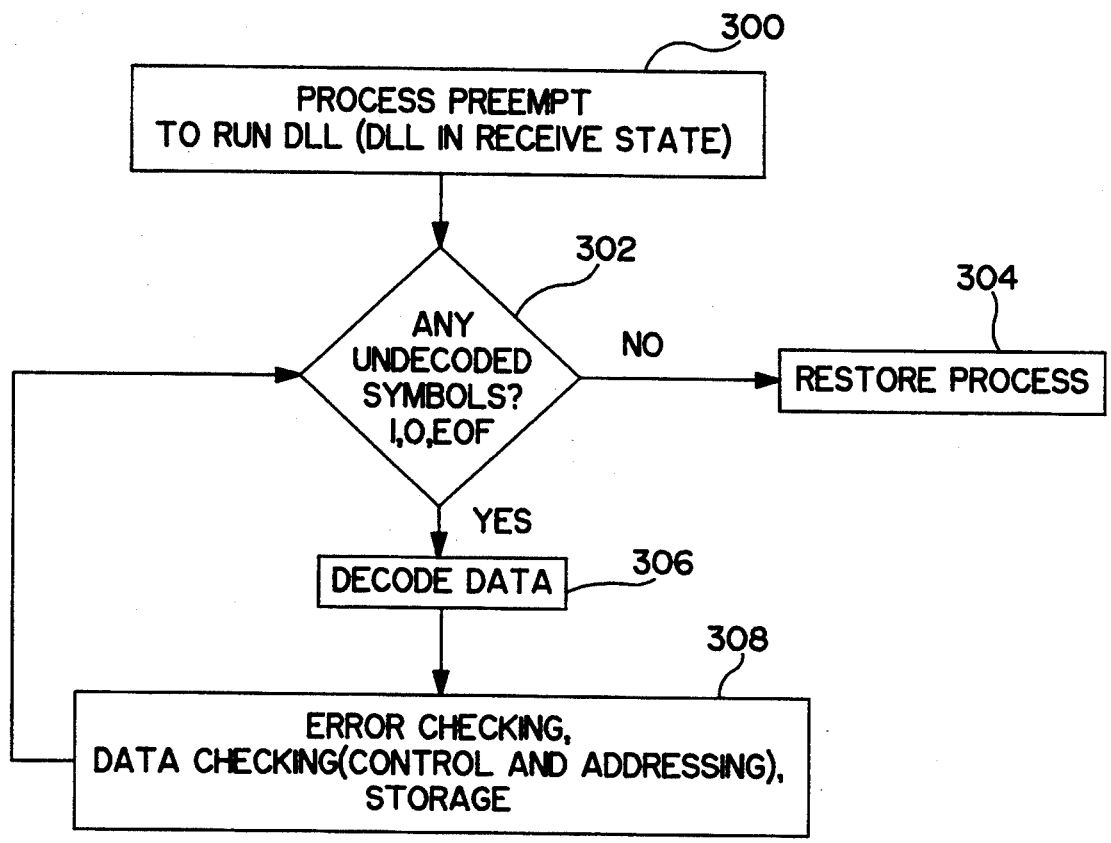
FIG. 12 is a flow chart diagram showing decoding of data in the network interface shown in FIG. 4.
Figure 13:
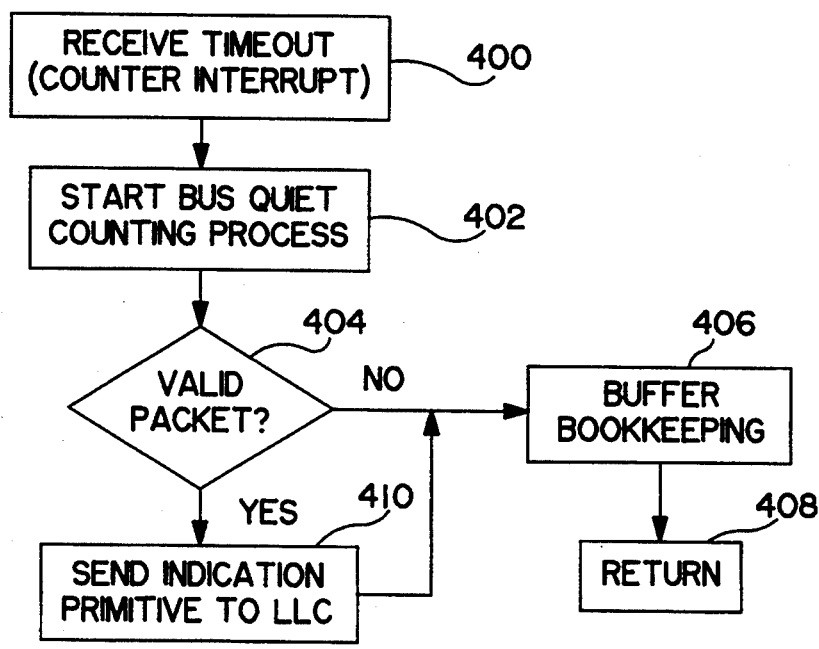
FIG. 13 is a flow chart diagram showing end of packet processing in the network interface shown in FIG. 4.

FIGS. 11 through 13 are flow diagrams showing the processes performed by CNI 14 while receiving a packet of data. Referring first to FIG. 11, at step 200, when a bus state transition is detected, an external bus interrupt occurs. A signal is transmitted to microprocessor 31 via an external interrupt pin (not shown). At step 202 the current context of the microprocessor 31 is saved (i.e., a pointer to the next instruction to be executed upon completion of interrupt processing and any internal flags). At step 204, the next instruction executed depends on the state of the network interface If the state is not "receive state", then this is the first symbol of the preamble of a new packet, and step 206 is executed to initialize the receive process. When the receive process is initialized, a receive counter is initialized to a value of 350 microseconds, from which the counter counts down towards zero. At step 208, a state variable is set to "receive". At step 210, the context saved at step 202 is restored to resume the process that preceded the interrupt. The process then returns at step 214. The receive counter continues to count down after the return.

For the second and subsequent high-low and low-high transitions, when an interrupt occurs, at step 204 the network interface state variable has a value representing a "receive" state, so step 212 is executed. For example, at the completion of the receipt of the first symbol, an interrupt occurs, and at step 204, execution passes to step 212. The current value of the receive counter is saved. This counter was initialized at the first transition. The symbol duration, as measured by the receive counter value, defines the symbol as a 1 (1 UST), a zero (2 UST's), or an EOF (3 UST's) (EOP's are decoded as described below with reference to FIG. 8). The raw count is saved into a raw count queue which is a buffer organized as a circular queue accessed by two pointers: a store pointer and an extract pointer. The store pointer and the extract pointer are used by DLL to find the next undecoded raw symbols that must be decoded into 1's, 0's, EOP's and EOF's. The receive counter is again initialized to 350. Step 210 is executed, restoring the process that preceded the interrupt, and the receive counter counts down till the next transition, which causes another interrupt. Steps 200–214 are then repeated.

Referring now to FIG. 12, the portion of the DLL that runs while BCC 10 is in receive state is shown. As mentioned above with reference to FIG. 9, a DLL counter continuously runs, so that DLL 108 is periodically executed. The microprocessor 31 will interrupt execution of the main loop (steps 100, 102 and 104) to execute DLL 108. When the DLL counter causes an interrupt by counting a predetermined number of cycles, the choice of DLL steps executed depends on the state of the DLL. If the DLL is in the "receive" state, then steps 300–308 as shown in FIG. 12 are executed.

At step 300, DLL processing is directed to the correct entry point. At step 302, the circular buffer into which the receive count is stored is checked to determine whether there are any undecoded symbols. At step 306, the DLL 108 (shown in FIG. 9) decodes the symbols, i.e., interprets them to be 1's, zeros or EOF's. The current receive counter value is subtracted from 350, and the difference is divided by 100 to determine the number of UST's.

At step 308, integrity checks, such as error checking, data checking and address checking are performed, and DLL 108 stores the decoded symbols into a circular queue (not shown) in RAM 30 called the receive buffer. A "byte store pointer" keeps track of the next available slot to store the decoded bytes. An address circular queue identifies the packet addresses of the decoded symbols in the receive buffer, so that DLL 108 can access the decoded symbols. Two pointers are also provided for accessing the address circular queue. The first pointer (the "frame extract" pointer) identifies the location in the address circular queue of the oldest undecoded packet, i.e., the next packet to be extracted from the receive buffer. The second pointer (the "frame store" pointer) identifies the location in the address circular queue of the address where the next packet address will be stored. Steps 302–308 are repeated while there are still undecoded symbols remaining. If there are no symbols left to be decoded, then the function of the DLL 108 is complete and, at step 304, the process preceding the DLL interrupt is restored.

Referring now to FIG. 13, the end of packet portion of the receive process is shown. As noted above, the receive counter is initialized to 350, from which it counts down. If 350 microseconds pass without a transition, then the symbol currently being received is an EOP symbol and the receive counter times out, causing an end of packet interrupt. The end of packet processing sequence starts at step 400. At step 402, a bus quiet counting process is initialized to determine the time between the completion of the EOP symbol and the next packet.

At step 404, checks are made to determine whether the packet is valid. If not, then at step 406, the packet is discarded, and buffer values are reset as though the packet had not been received. Then at step 408, the microprocessor 31 returns to the process that preceded the end of packet interrupt. If the packet is valid, then at step 410 a message called an indication primitive is sent to the logical link control (LLC) layer of DLL 108. Then the process returns at step 408.

Figure 14:
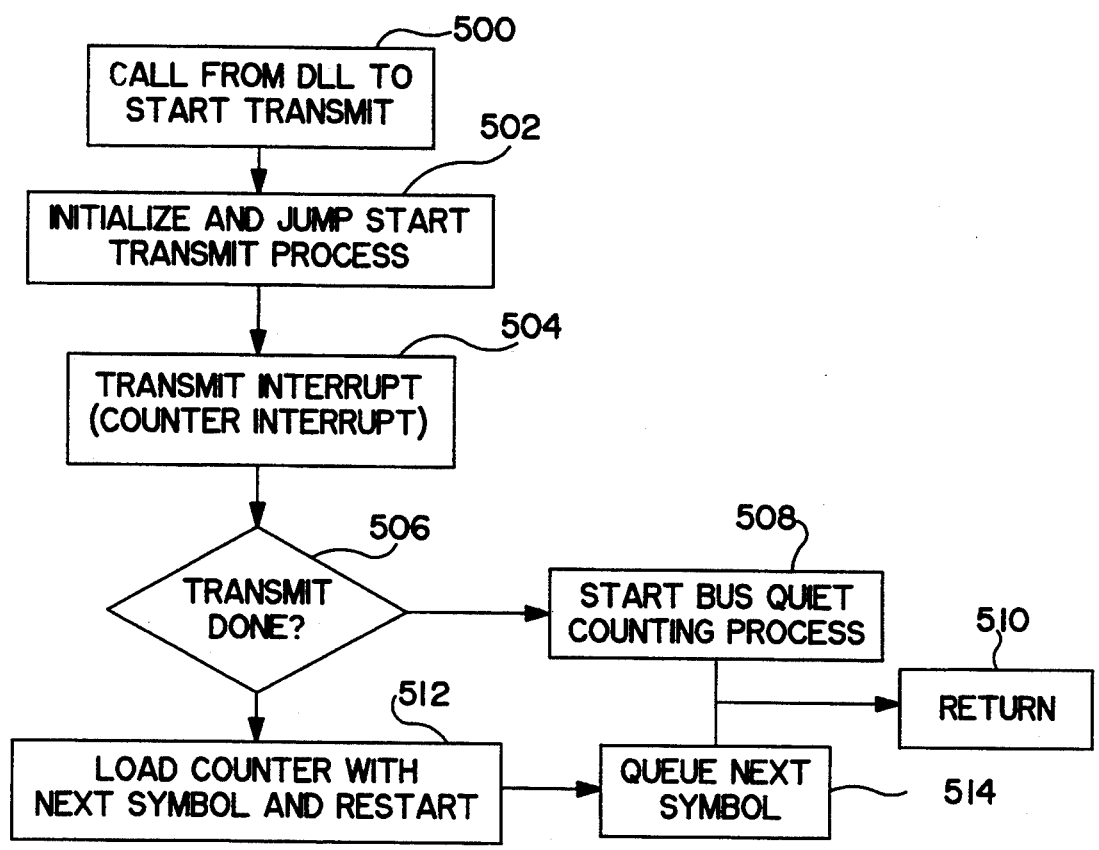
FIG. 14 is a flow chart diagram showing the transmit process in the network interface shown in FIG. 4.

Referring now to FIG. 14, the steps performed while transmitting a packet are shown. The application layer 104 determines that a packet is to be transmitted. At step 500, the application layer places a message called a request primitive in a mail box for the message transfer element (MTE) 102 (FIG. 9). The message is transferred from MTE 102 to the network layer 100, and from network layer 100 to DLL 108. The transmit process runs the data link itself, so that the normal preemptive DLL processing 108 is not needed. At step 502 parameters are initialized and DLL 108 initiates the transmit process by "jump starting" the transmit process.

"Jump starting" is performed when software loads the flag that normally causes a receive counter interrupt. At step 504 the interrupt is transmitted to the microprocessor 31. At step 506, the process determines whether the packet is done transmitting. If the transmission is not done, then at step 512, the counter is loaded with the time duration associated with the next symbol to be transmitted. At step 514, the next symbol to be transmitted is placed in queue so that it may be transmitted immediately at the completion of the symbol currently being transmitted. Then, at step 510, the process returns to the DLL process 108, which then returns to the main loop shown in FIG. 9. If at step 506, the packet is done, then, at step 508, the bus quiet counting process is started, and the process returns at step 510. The bus quiet count determines how long the bus state remains inactive in the "inferior" state.

Figure 15:
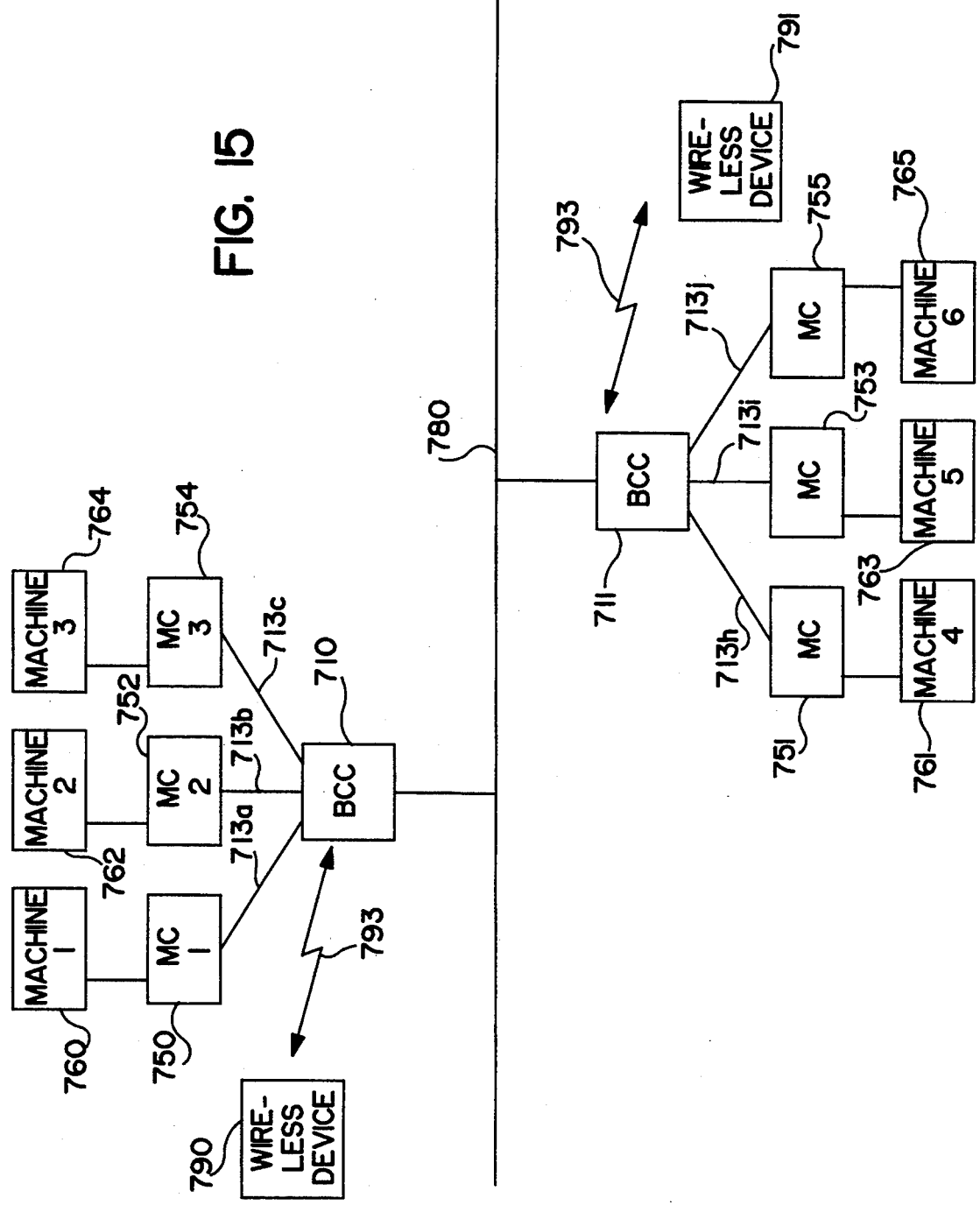
FIG. 15 is a block diagram of a second exemplary apparatus in accordance with the invention.
Figure 16:
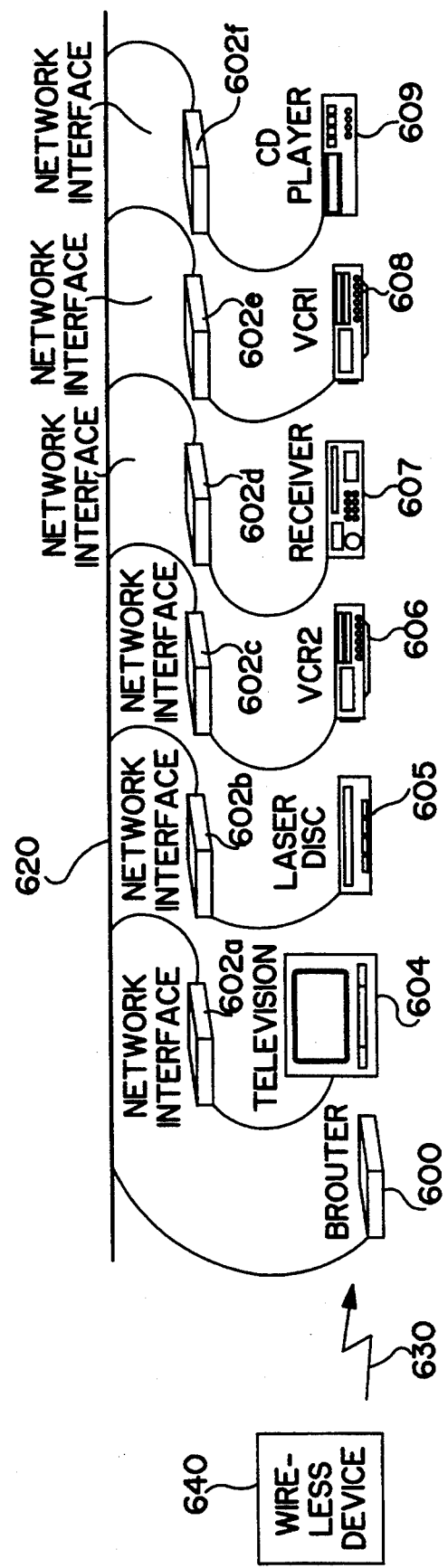
FIG. 16 is a block diagram of a prior art system.

Although the exemplary embodiment has been described in the context of a CEBus network for an automated home system, a variety of Brouter Cluster Controller systems may be configured in accordance with the invention. For example, FIG. 15 is a block diagram of a control system for an multi-station automated manufacturing process using BCCs 710 and 711 for communications within clusters, and to transmit data between clusters over a LAN 780. Each station of the manufacturing facility includes a respective microcomputer (MC) 750–755 and a respective machine 760–765 that is controlled by the MC 750–755. The MC's 750–755 execute predetermined program sequences asynchronously to control their respective machines 760–765.

In the exemplary manufacturing process, the machines 760–765 perform distinct operations on the articles produced, such that each article must pass through each station before it is completed. Some of the operations have a sequencing requirement; for example, an article must pass through machine 760 before machine 762, and the article must pass through machine 762 before machine 764. Other operations may not have sequencing requirements. For example, an article can be operated on by machine 761 before or after the article is operated on by machine 760.

MC 750 provides status information relating to its respective machine 760 to local MC's 752 and 754 by way of its local BCC 710. For example, MC 750 may identify the amount of time remaining before it completes its operation on the current article and passes the article on to machine 762. Once machine 760 completes processing on an article, respective MC 750 may send a command to MC 752 to start its operation on the article. These local status messages and command messages are relayed by BCC 710 back to MC's 752 and 754 without sending the messages over LAN 780.

Status messages and commands may also be sent between clusters. For example, MC 754 may send a status message to MC 751 by way of BCC 710, LAN 780 and BCC 711, to indicate that an article has completed processing on all of the machines 760, 762 and 764.

Status messages may be sent to a remote destination by wireless link 793. For example, the status messages may be sent over an RF link 793 to a wireless device 790, such as an RF receiver, in a production supervisor's office in another building.

The brouter cluster controller apparatus 710 of FIG. 15 may be configured to communicate with LAN 780 using a variety of multiple access communications protocols, including but not limited to Ethernet TM (Ethernet is a trademark of Xerox Corporation). The hardware and software configuration of the BCC's 710 and 711 would be tailored to meet the interface requirements of the LAN 780 protocol.

It is understood by one skilled in the art that many variations of the embodiments described herein are contemplated. While the invention has been described in terms of exemplary embodiments, it is contemplated that it may be practiced as outlined above with modifications within the spirit and scope of the appended claims.

What is claimed:

1. Apparatus for receiving data from a first medium and for transferring the data to one of a local device and a second medium comprising:
   means for receiving the data from the first medium;
   network interface means for examining the data and identifying the data as being directed to the one of the local device and the second medium, the network interface means including means for storing a plurality of encoded sequences and a plurality of device commands, each device command being associated with a respective one of the plurality of encoded sequences, and
   clustering means coupled to the network interface means for coupling the local device directly to the network interface means if the network interface means identifies the data as being directed to the local device, wherein the network interface means identifies whether the data include one of the plurality of encoded sequences and identifies the respective device command associated with the encoded sequence included in the data;

transmitting means for transmitting the identified device command from the network interface means to the local device by way of the clustering means if the network interface means identifies the data as being directed to the local device; and routing means for transmitting the data from the network interface means to the second medium if the network interface means identifies the data as being directed to the second medium.

2. In a system having first and second communications media and a plurality of devices, apparatus for transmitting data from a first one of the plurality of devices coupled to the first medium to one of a second one of the plurality of devices and a third one of the plurality of devices, wherein the second medium has a state in which the second medium is not available for transmitting data:

network interface means coupled to the first medium for receiving and examining data from the first device, wherein the network interface means is a consumer electronics bus (CEBus) network interface;

clustering means coupled to the network interface means for selectively coupling the second device to the network interface means if the network interface means identifies the second device as being coupled to the clustering means;

transmitting means for transmitting the data from the network interface means to the second device by way of the clustering means, regardless of whether the second medium is available for transmitting data, if the network interface means identifies the second device as being a destination to which the data are transmitted; and routing means for transmitting the data from the network interface means to the third device by way of the second medium if the network interface means identifies the third device as being the destination to which the data are transmitted.

3. Apparatus according to claim 2, wherein the data from the first medium originates from an infrared remote control unit.

4. Apparatus according to claim 3, wherein the local device is a home entertainment device selected from a group consisting of an audio equipment component and a video equipment component.

5. In a system having first and second communications media and a plurality of devices, apparatus for transmitting data from a first one of the plurality of devices coupled to the first medium to one of a second one of the plurality of devices and a third one of the plurality of devices, wherein the second medium has a state in which the second medium is not available for transmitting data:

network interface means coupled to the first medium for receiving and examining data from the first device;

clustering means coupled to the network interface means for selectively coupling the second device to the network interface means if the network interface means identifies the second device as being coupled to the clustering means;

transmitting means for transmitting the data from the network interface means to the second device by way of the clustering means, regardless of whether the second medium is available for transmitting data, if the network interface means identifies the second device as being a destination to which the data are transmitted;

routing means for transmitting the data from the network interface means to the third device by way of the second medium if the network interface means identifies the third device as being the destination to which the data are transmitted; and means for storing a respective address associated with each respective one of the plurality of devices, wherein the network interface means uses the addresses to determine whether the local device is coupled to the clustering means.

6. Apparatus according to claim 5, further comprising communications means for receiving the addresses and for providing the addresses to the storage means.

7. Apparatus according to claim 5, further comprising means for storing a plurality of device commands for controlling a device coupled to the clustering means.

8. Apparatus according to claim 5, further comprising means for storing a plurality of macro commands for controlling the apparatus.

9. In a system having first and second communications media and a plurality of devices, apparatus for transmitting data from a first one of the plurality of devices coupled to the first medium to one of a second one of the plurality of devices and a third one of the plurality of devices, comprising:

network interface means coupled to the first medium for receiving and examining data from the first device;

address storing means for storing a respective address associated with each respective one of the plurality of devices;

clustering means coupled to the network interface means for selectively coupling the second device to the network interface means if the network interface means identifies the second device as being coupled to the clustering means;

command storing means for storing a plurality of device commands for controlling a device coupled to the clustering means wherein the network interface means identifies one of the plurality of device commands associated with the data;

transmitting means for transmitting the identified device command from the network interface means to the second device by way of the clustering means if the network interface means identifies the second device as being a destination to which the identified device command is transmitted, wherein the network interface means determines whether the second device is coupled to the clustering means based on the addresses stored in the address storing means; and routing means for transmitting the data from the network interface means to the third device by way of the second medium if the network interface means identifies the third device as being the destination to which the identified device command is transmitted.

10. In a system having first and second communications media and a plurality of devices, apparatus for transmitting data from a first one of the plurality of devices coupled to the first medium to one of a second one of the plurality of devices and a third one of the plurality of devices, comprising:

network interface means coupled to the first medium for receiving and examining data from the first device;

address storing means for storing a respective address associated with each respective one of the plurality of devices;

clustering means coupled to the network interface means for selectively coupling the second device to the network interface means if the network interface means identifies the second device as being coupled to the clustering means;

command storing means for storing a plurality of macro commands for controlling the apparatus wherein the network interface means identifies one of the plurality of macro commands associated with the data;

transmitting means for transmitting the identified command macro from the network interface means to the second device by way of the clustering means if the network interface means identifies the second device as being a destination to which the identified command macro is transmitted, wherein the network interface means determines whether the second device is coupled to the clustering means based on the addresses stored in the address storing means; and routing means for transmitting the data from the network interface means to the third device by way of the second medium if the network interface means identifies the third device as being the destination to which the data are transmitted.

11. Apparatus according to claim 9, wherein the network interface means is a consumer electronics bus (CEBus) network interface.

12. Apparatus according to claim 11, wherein the data from the first medium originates from an infrared remote control unit.

13. Apparatus according to claim 12, wherein the local device is a home entertainment device selected from a group consisting of an audio equipment component and a video equipment component.

14. Apparatus according to claim 9, further comprising communications means for receiving the addresses and for providing the addresses to the storage means.

15. Apparatus according to claim 9, further comprising means for storing a plurality of macro commands for controlling the apparatus.

16. Apparatus according to claim 10, wherein the network interface means is a consumer electronics bus (CEBus) network interface.

17. Apparatus according to claim 16, wherein the data from the first medium originates from an infrared remote control unit.

18. Apparatus according to claim 17, wherein the local device is a home entertainment device selected from a group consisting of an audio equipment component and a video equipment component.

19. Apparatus according to claim 10, further comprising communications means for receiving the addresses and for providing the addresses to the storage means.

20. Apparatus according to claim 1, wherein the network interface means includes a path by which a user inputs the plurality of encoded sequences and the plurality of device commands.

* * * * *